July 23, 1935.  R. S. SANFORD  2,008,727

VACUUM CLUTCH CONTROL

Filed July 20, 1931

INVENTOR.
ROY S. SANFORD
BY H. O. Clayton
ATTORNEY.

Patented July 23, 1935

2,008,727

UNITED STATES PATENT OFFICE 2,008,727

VACUUM CLUTCH CONTROL

Roy S. Sanford, South Bend, Ind., assignor to Bragg-Kliesrath Corporation, South Bend, Ind., a corporation of New York Application July 20, 1931, Serial No. 551,956

9 Claims. (Cl. 192—.01)

This invention relates in general to control mechanism for automotive vehicles and in particular to a power operated clutch mechanism rendered operable by and in conjunction with the throttle control mechanism of the vehicle.

It has been proposed to operate the control valve of a clutch power actuator by the accelerator or throttle control mechanism. Such a structure is disclosed in the patent to Belcia, No. 1,470,272, dated October 9, 1923. This mode of operation, however, makes no provision for the timing of the clutch engagement with respect to the relative R. P. M.'s of the driving and driven clutch plates. It is, of course, desirable to effect the engagement of the clutch plates with a minimum of slipping and grabbing, and such an engagement is had when the engine is speeded up so that the R. P. M. of the driving clutch plate is equal to or substantially equal to that of the driven plate; accordingly, the principal object of the invention is to provide common means for conjoint operation of the throttle and clutch, which means permits of a control to insure non-slipping and non-grabbing clutch engagement at all speeds of the vehicle.

In one desirable arrangement the butterfly of the throttle is so connected to the accelerator pedal as to permit positive operation of the butterfly to accelerate the engine with either clockwise or counterclockwise rotation of the pedal, and such a structure is so interconnected with the control valve of the power actuator for the clutch as to effect the clutch engagement only when the pedal is actuated in the normal fashion, that is, in the clockwise direction. Such a structure permits of a speeding up of the engine, while the vehicle is in motion and declutched, to thus step up the R. P. M. of the driving clutch plate to equal that of the driven plate; the subsequent normal accelerator movement effecting the desired clutch engagement and continued throttle opening.

Other objects of the invention and desirable details of construction and combinations of parts will become apparent from the following detailed description of a preferred embodiment of the invention taken in conjunction with the accompanying drawing, in which.

Figure 1:
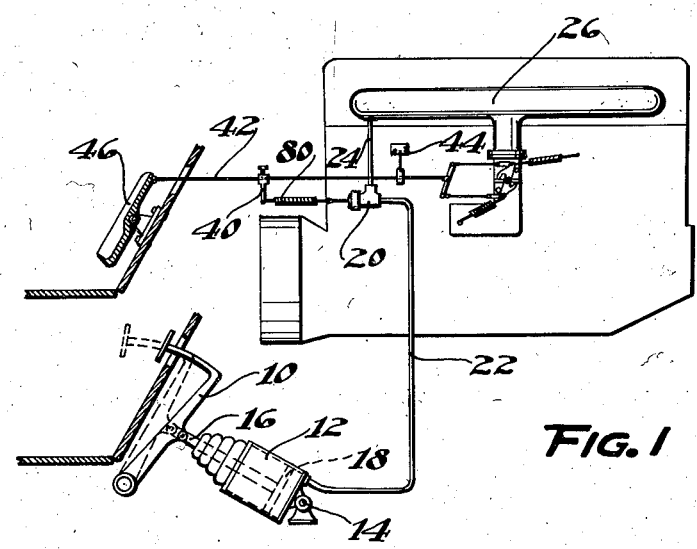
Figure 1 is a diagrammatic view of the clutch and throttle control mechanism constituting my invention.

In that embodiment of the invention disclosed in Figure 1 there is provided a conventional clutch pedal 10 for operation of a conventional clutch mechanism, not shown. A fluid motor or power actuator is adapted to control the rotation of the clutch pedal to effect the engagement and disengagement of the clutch plates. The actuator preferably comprises a cylinder 12 pivotally secured at 14 to a fixed portion of the chassis, the connecting rod 16 of the piston 18 being pivotally secured to the clutch pedal intermediate its ends. The actuator is adapted to be energized to impart a declutching movement of the pedal by virtue of its connection, via control valve 20 and conduits 22 and 24, to the intake manifold 26 of the internal combustion engine of the vehicle, which at closed throttle provides a pumping action of the engine pistons inducing a vacuum in the manifold and likewise in the actuator to thereby impose an atmospheric load on the piston 18 and effect the desired declutching operation.

Figure 3:
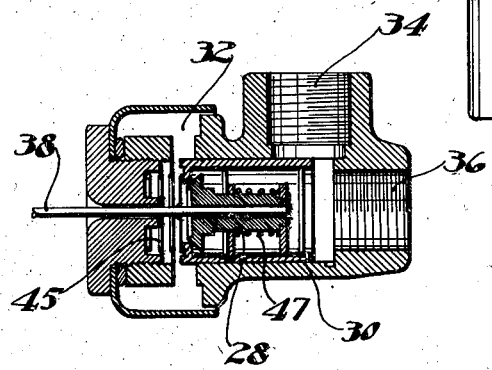
Figure 3 discloses an enlarged sectional view of the control valve for the clutch operating power actuator.

The control valve for the actuator is shown in detail in Figure 3 and briefly comprises spring pressed atmospheric and vacuum valve members 28 and 30 controlling atmospheric, vacuum and outlet ports 32, 34 and 36, respectively, to render the valve operative for the purposes intended. This particular valve structure forms no part of the present invention being fully disclosed, described and claimed in the application of Victor W. Kliesrath, filed October 10, 1931.

The valve is operated to place the actuator alternately in communication with the manifold to disengage the clutch and with the atmosphere to permit clutch engagement by means of a link 38, which is yieldably connected to a short link 40, the latter being adjustably connected to a link 42 supported by bracket 44. The link 42 serves to interconnect the accelerator pedal 46 with the lost motion or two-direction throttle operating linkage described in detail hereinafter.

In the off position of the parts, as disclosed in full lines in Figure 1, the accelerator pedal is in its neutral position, the throttle being closed to its engine idling position and the atmospheric and vacuum valve members closed and opened respectively by compressed springs 45 and 47. Figure 3, to place the actuator in circuit with the manifold to evacuate the actuator and maintain the clutch plates disengaged.

The invention is particularly concerned, however, with means for the actuation of the throttle with either counterclockwise or clockwise movement of the accelerator pedal without, however, effecting an operation of the valve to effect clutch engagement during counterclockwise pedal movement.

Figure 2:
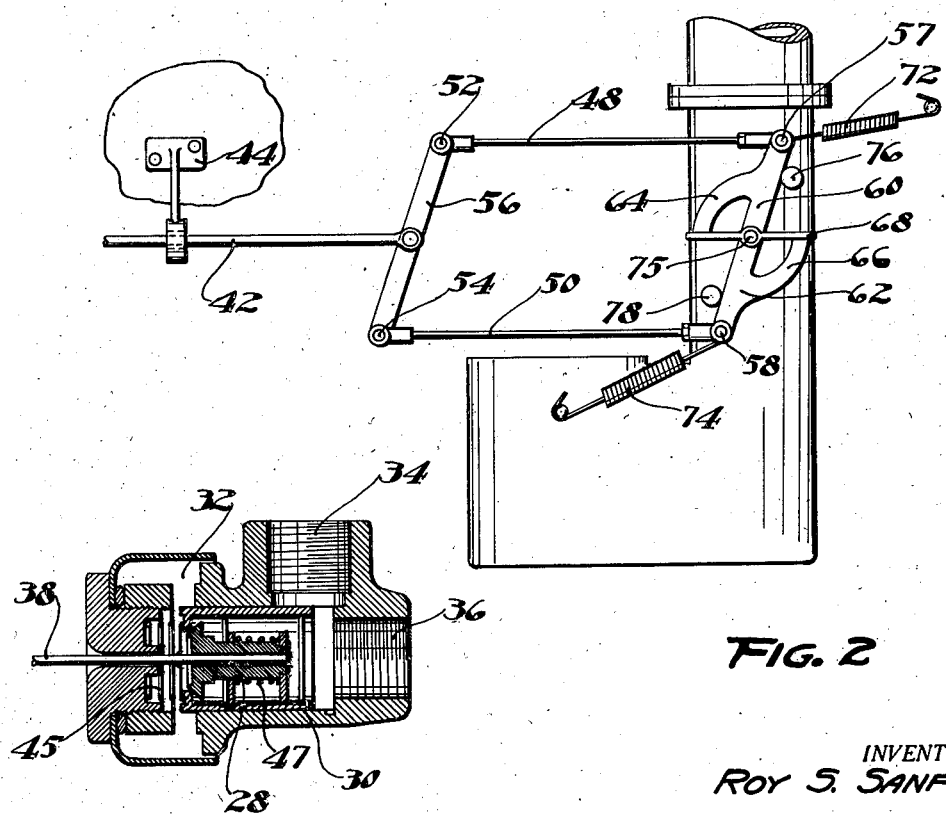
Figure 2 is an enlarged view of the two-direction throttle control mechanism.

Accordingly, with this end in view there is suggested the two-directional control mechanism disclosed in detail in Figure 2 comprising links 48 and 50 pivotally connected at 52 and 54 to a bar 56, the latter pivotally connected intermediate its ends to the accelerator operated link 42. The links 48 and 50 are preferably adjustably and pivotally connected at 57 and 58 to relatively movable lever members 60 and 62, respectively, each of said members being adapted, by virtue of curved arm portions 64 and 66, to rotate the butterfly valve member 68 counterclockwise to open the throttle. The lever members together with the butterfly valve member are rotatably mounted on a common shaft 75. In the closed throttle position of the aforementioned parts tensioned springs 72 and 74 urge the lever members against stops 76 and 78, and a coiled spring, not shown, returns the butterfly valve member to its closed or idling engine position. The springs 72 and 74 also serve to maintain the accelerator pedal in its neutral position when the operator's foot is removed from the pedal and likewise serve to tension spring 80 to compress springs 45 and 47 to maintain the valve open to vacuum.

In operation, clockwise actuation of the accelerator pedal in the conventional manner serves to open the throttle by placing the link 42 in compression, the bar 56 being rotated counterclockwise fulcruming at 52 by virtue of the contact of member 60 against stop 76. The link 50 is thus placed in compression, rocking the connected lever member 62 counterclockwise and opening the butterfly valve to admit additional volatilized fuel and accelerate the engine. Such a conventional movement of the accelerator pedal also automatically effects a clutch engagement by permitting the valve to vent the actuator. With release of the accelerator to close the throttle the clutch is automatically disengaged as previously described. A "free wheeling" operation of the vehicle is thus provided, the clutch being automatically disengaged with each closing of the throttle.

It is desirable, however, to time the engagement of the clutch so that the plates will engage without either grabbing or slipping. This is particularly desirable with the vehicle free wheeling or coasting at high speeds, at which time the engine speed should be increased to synchronize with the vehicle speed so that the R. P. M.'s of the driving and driven clutch plates are equal or substantially equal. The efficacy of the present invention will at once become apparent for at such speeds it is merely necessary to depress the accelerator pedal with the heel of the foot to thereby rotate the pedal counterclockwise and place the link 42 in tension. The bar 56 will then fulcrum at 54, the lever member 62 abutting stop 78, and the rotating bar will actuate link 48 and member 60 counterclockwise to again open the butterfly.

However, the placing of link 42 in tension merely further tensions spring 80 and further compresses valve springs 45 and 47, the valve continuing to maintain the actuator in circuit with the manifold to keep the clutch disengaged. The heel operation of the pedal thus provides a means for speeding up the engine without engaging the clutch, and when the operator estimates the engine speed to be sufficiently high to correspond with the vehicle speed he then quickly reverses the operation of the pedal, depressing the same with the toe. This permits the clutch to engage in the manner described and also permits of a continued opening of the throttle to maintain or increase the vehicle speed.

The momentary release of the pedal to return to its dead center or neutral position and the subsequent toe operation to again open the throttle and vent the valve cause a certain loss of time in the control of the vehicle and a slight slowing down of the engine; however, the inertia of the moving engine parts tends to reduce the effect of this momentary throttle closing to a minimum and with practice the operator becomes skilled in this particular operation.

As previously stated, this control is particularly advantageous with the vehicle free wheeling at high speeds; however, it will be apparent that this mode of control may also be employed at any time during the operation of the vehicle while the same is in motion; accordingly, the clutch engagement may be controlled during the low to intermediate and intermediate to high gear shifting operations. The described mechanism is also advantageous in cold weather for the motor may be speeded up to warm the engine without, however, unnecessarily operating the clutch.

While one illustrative embodiment has been described, it is not my intention to limit the scope of the invention to that particular embodiment, or otherwise than by the terms of the appended claims.

I claim:

1. In an automotive vehicle having an engine controlling throttle and a clutch mechanism, means for operating said clutch mechanism and means operable in either of two directions from a neutral position for opening said throttle, both of said means being interconnected in such a manner as to effect a clutch engaging operation of said clutch operating means with one direction of movement of said throttle controlling means beyond said neutral position and have no effect upon said clutch operating means in the other direction of movement of said throttle controlling means beyond said neutral position.

2. In an automotive vehicle having an engine controlling throttle and a clutch mechanism, vacuum operated power means for operating said clutch mechanism, an accelerator control means operable in either of two directions for actuating said throttle, both of said means being interconnected in such fashion as to permit operation of said clutch operating means in one direction of movement of said throttle controlling means but having no effect upon said clutch operating means in the reverse direction of movement of said throttle controlling means.

3. In an automotive vehicle provided with a clutch, a throttle and a throttle controlling accelerator pedal, power means for operating said clutch, and means interconnecting said pedal, power means and throttle, said interconnecting means being constructed and arranged to open the throttle and automatically engage the clutch with one direction of movement of said pedal and to open the throttle without engaging the clutch with a different direction of movement of said pedal.

4. In an automotive vehicle provided with a throttle and an accelerator pedal, linkage interconnecting said throttle and pedal, said linkage including alternately movable links for actuating the butterfly valve member of said throttle, said links and butterfly being interconnected to effect an opening of said butterfly by means of oppositely disposed lever members acting upon said butterfly member.

5. In an automotive vehicle having a throttle and an accelerator pedal, linkage interconnecting said throttle and pedal, said linkage including two three-arm lever members, each having one arm in disconnected engagement with the butterfly valve member of said throttle, a link connected to one of the remaining arms of each lever, the third arms of said levers being rotatably mounted on a shaft forming a common mounting for said levers and butterfly valve member, a bar member pivotally connected to said links, a link interconnecting said pedal and bar, stop members adapted to contact said levers in their off position and yieldable means urging said lever members into contact with said stops.

6. In an automotive vehicle provided with a throttle and an accelerator pedal, linkage interconnecting said throttle and pedal, said linkage including alternately movable links operable by said pedal for actuating the butterfly valve member of said throttle, said links being bodily movable in opposite directions.

7. In an automotive vehicle provided with a throttle comprising a butterfly valve member, said vehicle being further provided with a manually operable member for effecting the operation of said butterfly valve member, linkage interconnecting said manually operable member and said butterfly valve member, said linkage including a lever member, and means connected with each end of said lever member for operating said butterfly valve member in one direction of movement whereby with operation of said manually operable member in either of two directions of movement the fulcrum of said lever is shifted to effect the unidirectional movement of the butterfly valve member.

8. In an automotive vehicle having an engine controlling throttle and a clutch mechanism, vacuum operated power means for operating said clutch mechanism, a three-way control valve for said power means, an accelerator controlling means operable in either of two directions for actuating said throttle, means interconnecting said accelerator controlling means and said valve, the aforementioned connections being so related as to permit operation of said valve means to operate the clutch, in one direction of movement of said throttle controlling means, but having no effect upon said valve means in the reverse direction of movement of said throttle controlling means, said connection between the accelerator controlling means and said valve including a spring to insure the aforementioned operation.

9. In an automotive vehicle provided with a clutch, an engine throttle, power means for operating the clutch, a control valve for said power means, a manually operable control means, means interconnecting said manually operable means, control valve and throttle, and comprising means for effecting a conjoint operation of the throttle and valve and further comprising means for operating the throttle independently of said control valve whereby the relative timing of the operation of the power means and the acceleration of the engine may be controlled at the will of the driver.

ROY S. SANFORD.

DISCLAIMER 2,008,727.—*Roy S. Sanford*, South Bend, Ind. VACUUM CLUTCH CONTROL. Patent dated July 23, 1935. Disclaimer filed April 3, 1937, by the assignee, *Bragg-Kliesrath Corporation*.

Hereby enters this disclaimer to claim 9 in said specification.

[*Official Gazette April 27, 1937.*]